US009878276B2

(12) United States Patent
Pellizzari et al.

(10) Patent No.: US 9,878,276 B2
(45) Date of Patent: Jan. 30, 2018

(54) MISTING APPARATUS AND DUST SUPPRESSION SYSTEM EMPLOYING THE SAME

(71) Applicant: FLINDERS PORTS PTY LTD, Port Adelaide (AU)

(72) Inventors: Andrew Mark Pellizzari, Port Adelaide (AU); Daniel Edwin Sloan, Port Adelaide (AU); Darren James Franklin, Port Adelaide (AU); Grant Adrian McAlpine, Port Adelaide (AU); Henry Minkus, Port Adelaide (AU); Bartosz Kuciel, Port Adelaide (AU)

(73) Assignee: Flinders Ports Pty Ltd, Port Adelaide (AU)

( * ) Notice: Subject to any disclaimer, the term of this patent is extended or adjusted under 35 U.S.C. 154(b) by 53 days.

(21) Appl. No.: 14/907,049

(22) PCT Filed: Jul. 25, 2014

(86) PCT No.: PCT/AU2014/000751
§ 371 (c)(1),
(2) Date: Jan. 22, 2016

(87) PCT Pub. No.: WO2015/010160
PCT Pub. Date: Jan. 29, 2015

(65) Prior Publication Data

US 2016/0166969 A1 Jun. 16, 2016

(30) Foreign Application Priority Data

Jul. 26, 2013 (AU) ................................ 2013902779

(51) Int. Cl.
*B01F 3/04* (2006.01)
*F24F 6/14* (2006.01)
(Continued)

(52) U.S. Cl.
CPC .......... *B01D 47/06* (2013.01); *B01F 3/04056* (2013.01); *B05B 3/022* (2013.01);
(Continued)

(58) Field of Classification Search
CPC .... B01F 3/04; B01F 3/04007; B01F 3/04021; B01F 3/04056; B01F 3/04049; F24F 6/14
(Continued)

(56) References Cited

U.S. PATENT DOCUMENTS 1,586,997 A * 6/1926 Hull ........................ B05B 3/022 239/214
2,576,143 A 11/1951 Rochet
(Continued)

FOREIGN PATENT DOCUMENTS

DE 20119003 2/2002
EP 1726777 B1 3/2009
(Continued)

OTHER PUBLICATIONS

International Search Report and Written Opinion prepared by the Australian Patent Office on Sep. 23, 2014, for International Application No. PCT/AU2014/000751.

*Primary Examiner* — Robert A Hopkins
(74) *Attorney, Agent, or Firm* — Sheridan Ross PC

(57) ABSTRACT

The present invention relates to a dust suppression system for use in a container, and a misting apparatus therefor. In one form, the dust suppression, system comprises at least one misting apparatus for contributing to the creation of a mist layer for preventing the escape of the dust from the container, the misting: apparatus comprising a means for generating an airflow, and a means for producing a mist in the airflow so that the mist is carried by the airflow.

21 Claims, 4 Drawing Sheets

(51) Int. Cl.

| | |
|---|---|
| ***B01D 47/06*** | (2006.01) |
| ***B08B 17/00*** | (2006.01) |
| ***B63B 25/04*** | (2006.01) |
| ***B65G 69/18*** | (2006.01) |
| ***E21F 5/02*** | (2006.01) |
| ***B05B 3/06*** | (2006.01) |
| ***B05B 3/02*** | (2006.01) |
| ***B05B 7/00*** | (2006.01) |

(52) U.S. Cl.
CPC .............. *B05B 3/06* (2013.01); *B05B 7/0081* (2013.01); *B08B 17/00* (2013.01); *B63B 25/04* (2013.01); *B65G 69/188* (2013.01); *E21F 5/02* (2013.01); *F24F 6/14* (2013.01)

(58) Field of Classification Search
USPC ........................................... 261/30, 116, 78.2
See application file for complete search history.

(56) References Cited

U.S. PATENT DOCUMENTS

| | | | | |
|---|---|---|---|---|
| 4,714,097 | A | 12/1987 | Binzen et al. | |
| 4,756,646 | A | 7/1988 | Spencer | |
| 5,352,297 | A | 10/1994 | Peters | |
| 5,439,618 | A | 8/1995 | Trapasso | |
| 7,389,824 | B2 | 6/2008 | Jackson | |
| 2003/0062174 | A1* | 4/2003 | Passoni ................ | A62C 3/0207 169/46 |
| 2016/0039623 | A1 | 2/2016 | Pellizzari et al. | |

FOREIGN PATENT DOCUMENTS

| | | |
|---|---|---|
| JP | S48-87559 | 11/1973 |
| JP | S49-73069 | 6/1974 |
| JP | S52-40528 | 9/1977 |
| JP | S53-022270 | 3/1978 |
| JP | S53-108083 | 8/1978 |
| JP | S58-100035 | 6/1983 |

* cited by examiner

MISTING APPARATUS AND DUST SUPPRESSION SYSTEM EMPLOYING THE SAME

CROSS REFERENCE TO RELATED APPLICATIONS

This application is a national stage application under 35 U.S.C. 371 and claims the benefit of PCT Application No. PCT/AU2014/000751 having an international filing date of Jul. 25, 2014, which designated the United States, which PCT application claimed the benefit of Australian Provisional Patent Application No. 2013902779 titled "A MISTING APPARATUS AND DUST SUPPRESSION SYSTEM EMPLOYING THE SAME" and filed on 26 Jul. 2013, the disclosures of each of which are incorporated herein by reference in its entirety.

INCORPORATION BY REFERENCE

The following publication is referred to in the present application and its contents are hereby incorporated by reference in their entirety:

International Patent Application No PCT/AU2013/000550 titled "A DUST SUPPRESSION SYSTEM FOR LOADING SHIP HOLDS" in the name of Flinders Ports Pty Limited.

TECHNICAL FIELD

The present invention relates to the suppression of dust from dusting materials, and a system and a misting apparatus therefor. Throughout the specification "dusting materials" is a term used to refer to a material which contains a significant amount of dust, or which releases a dust when agitated such as by movement.

In a particular form the present invention relates to suppression of dusting materials during loading aboard, or unloading these from, a vessel.

BACKGROUND

The loading and unloading of ships with dusting materials creates a significant amount of dust. Depending on the nature of the material, this dust is at least messy and therefore undesirable, and at worst dangerous.

Solutions for this problem (not including the solution disclosed in the application referenced herein) have been previously proposed, which involved misting the space above the material, however the dust would still become airborne and escape the hatch.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect, there is provided a dust suppression system for use in a container for a dusting material which creates a dust when agitated, the system comprising at least one misting apparatus contributing to the creation of a mist layer for preventing the escape of the dust from the container, the misting apparatus comprising a means for generating an airflow, and a means for introducing a fluid to the airflow so as to form a mist that is carried by the airflow.

In one form, the container is a hold of a ship, the hold having a hatch.

In one form, the system comprises a plurality of the misting apparatus cooperatively forming the mist layer substantially across an extent of the hatch.

In one form, the dust suppression system comprises a plurality of the misting apparatus positioned about a perimeter of the hatch. In one form, the plurality of misting apparatus is suspended from and spaced apart about the perimeter of the hatch.

In one form, the or each apparatus is connected to a fluid supply, and the system further comprises a means for providing the fluid to the or each apparatus under pressure.

In one form, for the or each apparatus, the means for generating the airflow is powered by the means for introducing the fluid to the airflow.

In one form, the or each misting apparatus comprises a body, a rotating assembly supported by the body so as to be rotatable about an axis of rotation, the rotating assembly comprising a fan, a turbine comprising at least one rotor assembly, a fluid emitter issuing a jet of a fluid to drive the rotating assembly, the fluid emitter being so positioned with respect to the fan as to issue the jet of fluid into the airflow generated by the fan.

According to a further aspect, there is provided a misting apparatus comprising a body, a rotating assembly supported by the body so as to be rotatable about an axis of rotation, the rotating assembly comprising a fan, a turbine comprising at least one rotor assembly, a fluid emitter issuing a jet of a fluid to drive the rotating assembly, the fluid emitter being so positioned with respect to the fan as to issue the jet of fluid into the airflow generated by the fan to form a mist that is carried by the airflow.

In one form, the turbine is a reaction turbine.

In one form, the turbine is an impulse turbine.

In one form, the rotating assembly comprises a hub, the fan comprises at least one fan blade depending from the hub, and the rotor assembly comprises at least one rotor arm comprising the fluid emitter extending radially from the hub and receiving a supply of a fluid therefrom, and wherein the or each rotor arm is adapted to issue the jet of the fluid at a distance from the axis of rotation to drive rotation of the rotating assembly and the or each fan blade depending therefrom, to create an airflow into which the or each jet of fluid is issued.

In one form, the or each rotor arm is tubular and the fluid emitter is a jet nozzle oriented to discharge the jet to drive rotation of the rotating assembly.

In one form, the rotating assembly comprises a plurality of fan blades equi-spaced around the hub to form the fan.

In one form, the rotating assembly comprises a plurality of rotor arms equi-spaced around the hub to form the rotor assembly positioned in the airflow issuing from the fan.

In one form, the turbine is an impulse turbine.

In one form, the fluid emitter depends from the body, the rotating assembly comprises a hub, the fan comprises at least one fan blade depending from the hub, and the rotor assembly comprises at least one blade or bucket at which the jet of fluid is directed to drive rotation of the rotating assembly and the or each fan blade depending therefrom, to create an airflow into which the or each jet of fluid is issued.

In one form, the body comprises a shroud for the rotating assembly.

In one form, the shroud is tubular, and comprises a central axis which is substantially coaxial with the axis of rotation for the rotating assembly, and which comprises an inlet for air, and an outlet for a mist entraining airflow.

In one form, the misting apparatus comprises a further means for introducing the fluid to the airflow.

In one form, the misting apparatus comprises a fluid line extending about a perimeter of the outlet, the fluid line comprising a plurality of spaced secondary fluid emitters each directed so as to release fluid into the airflow.

In one form, the secondary fluid emitters are misting nozzles.

In one form, the system can be attached to one or more sides of the container.

In one form, the dust suppression system comprises a plurality of the misting apparatus suspended and spaced apart about the perimeter of the container.

In one form, each of these apparatus is connected to a fluid supply, and the system further comprises a means for providing fluid to the or each apparatus under pressure.

According to a further aspect, there is provided a misting apparatus comprising a means for generating an airflow, and a means for introducing a fluid to the airflow so as to form a mist that is carried by the airflow.

In one form, the misting apparatus comprises a further means for introducing a fluid to the airflow so as to form a mist that is carried by the airflow.

In one form, one of the means for introducing the fluid to the airflow also drives the means for generating the airflow.

In one form, either of the apparatus or system described herein can be used in, or as a part of, or in conjunction with, either of the apparatus or system disclosed in PCT/AU2013/000550.

A detailed description of one or more embodiments of the invention is provided below along with accompanying Figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
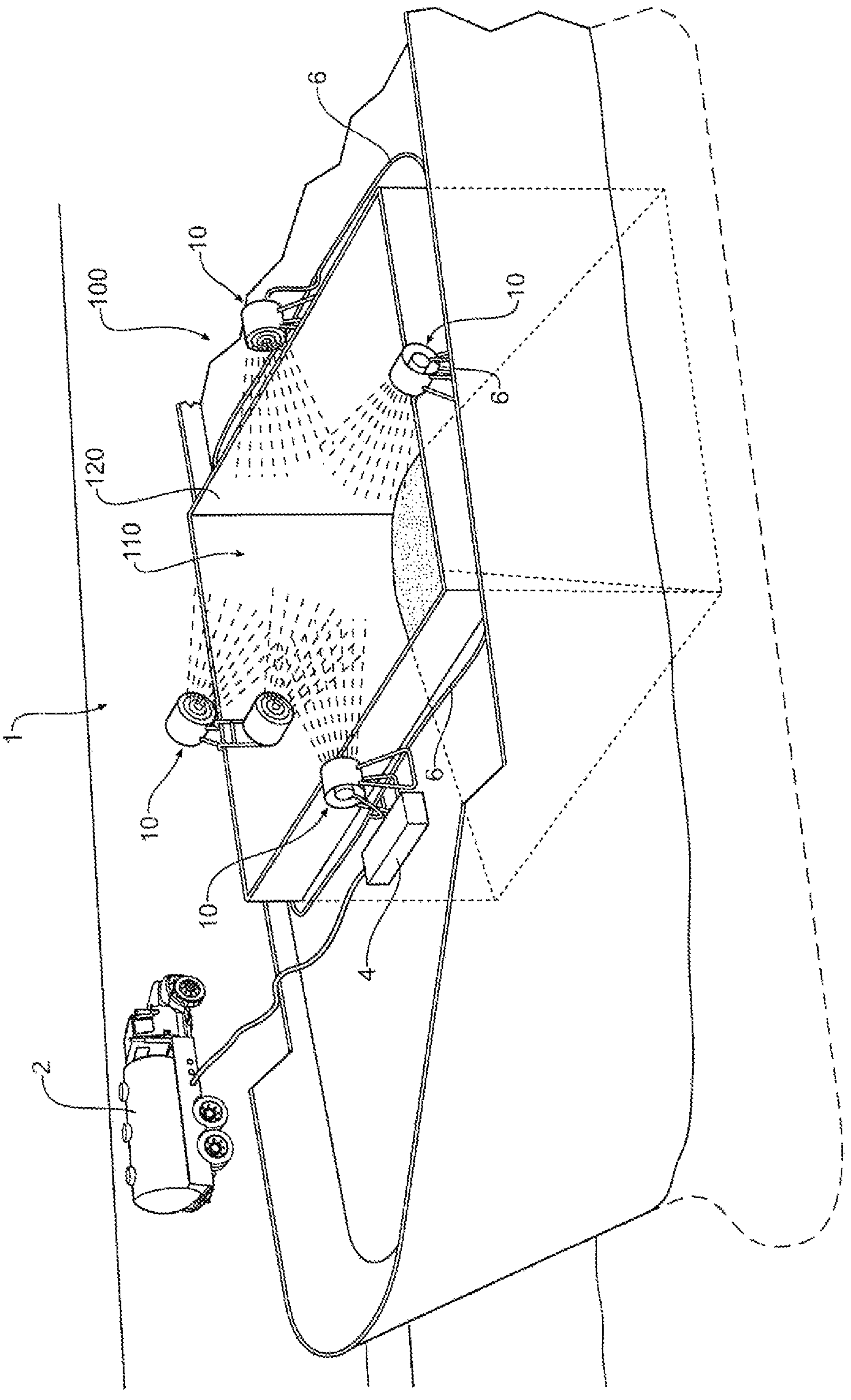
FIG. 1 is a schematic illustration of a dust suppression system in use in a ship hold.
Figure 2:
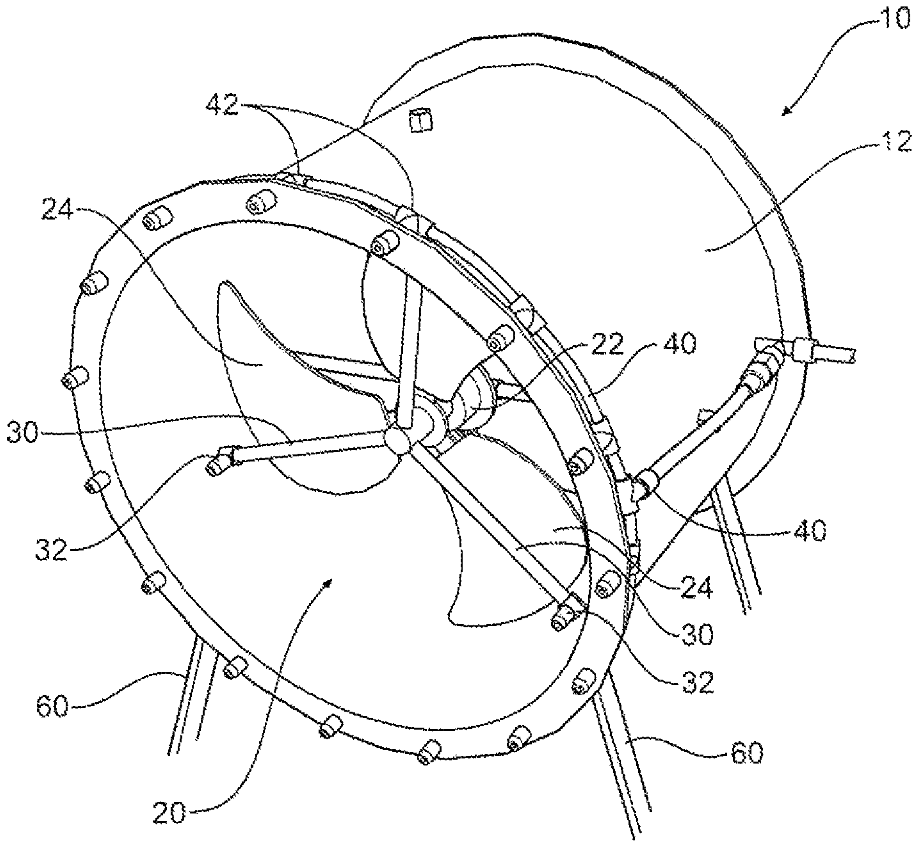
FIG. 2 is a front perspective view of a misting apparatus or mister for the dust suppression system of FIG. 1.
Figure 3:
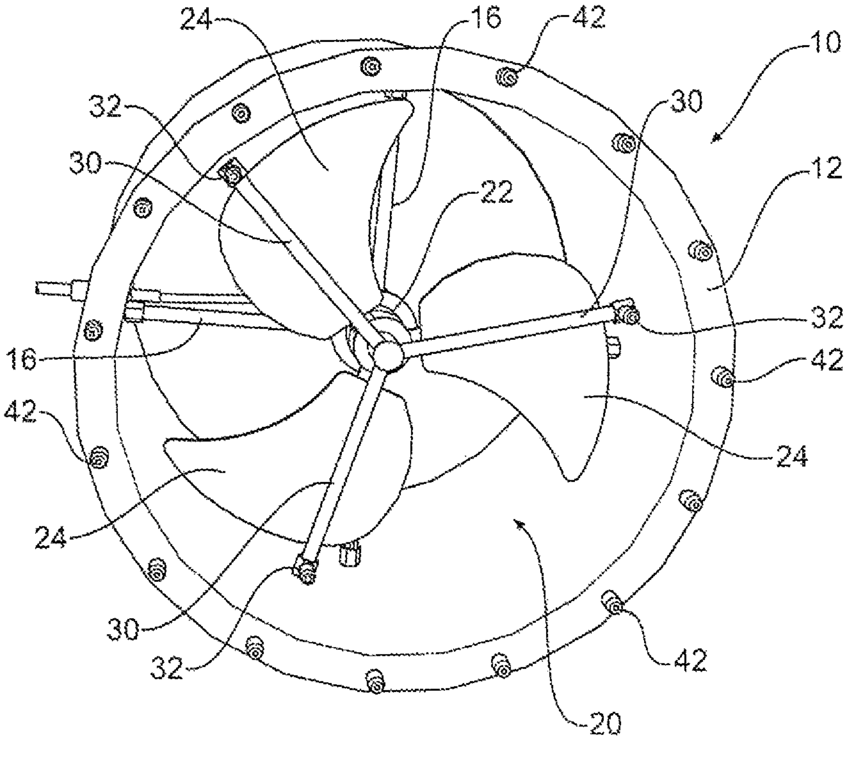
FIG. 3 is a front view of the misting apparatus of FIG. 2, wherein a front fan guard is removed for improved visibility of internals.

Referring now to FIG. 1, where there is illustrated a bulk storage ship 100 having a hold 110 with an uppermost hatch 120, via which a dusting material can be loaded and unloaded. During loading and unloading operations, a dust suppression system 1 may be employed to prevent dust created by this agitation of the dusting material, from escaping the hatch 120.

The dust suppression system 1 comprises a plurality of misting apparatus 10 spaced apart about a perimeter of the hold 110.

Fresh water is drawn from a tank 2 or a reticulated (i.e. mains) supply. The pump 4, draws the water through a series of water filters, and supplies the filtered water under constant pressure to the misting apparatus 10 via hoses 6. The pump station 4 may be any one of fixed in position, portable, positioned on the wharf or jetty or mounted on a truck (i.e. a tanker 2).

Each misting apparatus 10 may be positioned about the hatch 120, or suspended in the hold 110 from the edge of the hatch 120.

Referring now to FIGS. 2 through 5, each misting apparatus 10 comprises a body 12 in the form of a cylindrical shroud for a rotating assembly 20. This shroud 12 is supported on a stand 60 in such a way that there is some adjustability of the direction in which the mist is thrown. At least tilt adjustment and elevation adjustment are preferable.

The rotating assembly 20 comprises a hub 22 which is rotatably supported at a centre of the shroud 12 by a fixed hub mount 14 (see FIG. 5) which is in turn supported by four structural ties 16 which extend radially from the hub mount 14 to the shroud 12.

A plurality (3 in this case) of fan blades (or vanes) 24 extend radially from the hub 22 so as to form a fan for creating an airflow.

The misting apparatus 10 further comprises a plurality (3 in this case) of rotor arms 30 extending radially from the hub 22 so as to form a rotor assembly which is positioned in the airflow issued by the fan.

In use, each rotor arm 30 receives a supply of fluid from a fluid passageway extending through the hub mount 14 and hub 22 to the rotor, each rotor arm 30 comprises a fluid passageway which extends through and along the rotor arm 30 to a high pressure fluid nozzle 32 positioned near an outermost end of the rotor arm 30. This high pressure nozzle 32 issues a jet of fluid which is directed so as to drive rotation of (i.e. spin) the rotating assembly 20, causing the fan to create the airflow into which each jet of fluid is issued. The fluid jets issuing from the nozzles 32 into the airflow provide a first source of mist.

The high pressure nozzles 32 are replaceable and interchangeable, in this way the speed of the fan can be adjusted by changing to nozzles having a different aperture size, and/or by changing the water pressure, and/or the number rotor arms 30.

It will be apparent from the above that the misting apparatus 10 does not require electrical power (electric fans would however), eliminating the electrocution risks associated with electrical cables, especially where personnel are positioning misting apparatus 10 on a damp deck around the hold of the vessel.

Figure 4:
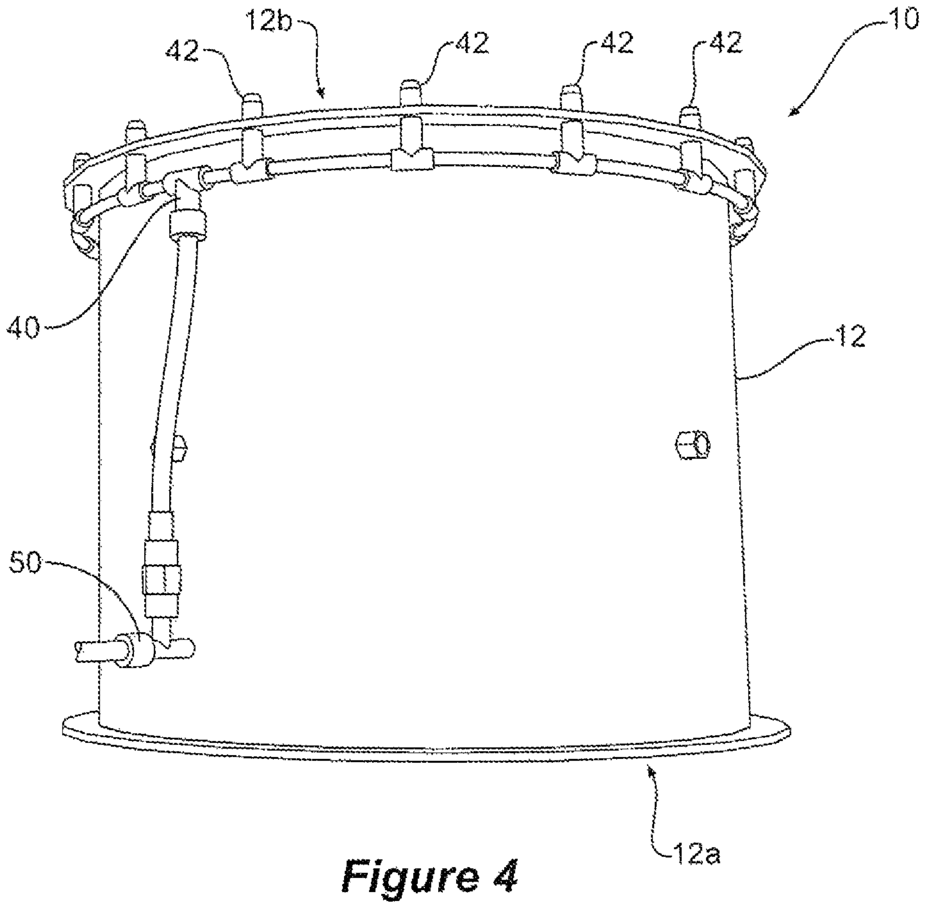
FIG. 4 is a top view of the misting apparatus of FIG. 3 (i.e. minus fan guard)
Figure 5:
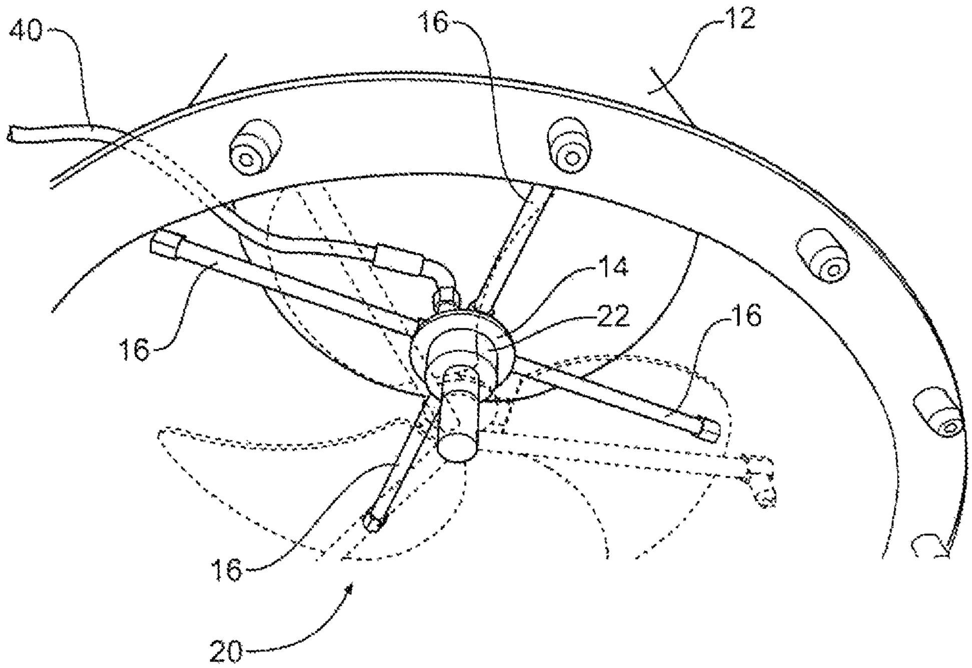
FIG. 5 is a detailed view of a mount for a rotating assembly of the misting apparatus.

With reference to FIG. 4, it can be seen that the shroud 12 comprises an inlet 12A at an inlet end via which the fan will draw air, and an outlet 12B at an outlet end from which a mist entraining airflow will be released. Each end is covered by a fan guard 13 (see FIG. 1) formed from an open wire-like configuration.

An external fluid line 40 extends about a perimeter of the shroud outlet, which comprises a plurality of spaced apart misting nozzles 42, each directed so as to release its mist into the airflow issuing from the fan. These misting nozzles 42 issuing into the airflow provide a second source of mist. These nozzles 42 can be angled and are interchangeable for different and/or varying apertures sizes, depending on the dust particle sizes being generated by the dusting material being handled.

Alternatively, uppermost nozzles 42 in the fluid line 40 may be selected to produce droplets of a different size to lowermost nozzles. For example, a droplet issued from an upper nozzle may be smaller than a droplet issued from a lower nozzle. Droplets issued from a lower nozzle can be the same size or smaller than the dust particles so that the droplets attach to particles of the dusting material to weigh these down and force them to sink down into the hold 110. Droplets issued from an upper nozzle can be sized to suppress the droplets issued from a lower nozzle, along with the dust, and prevent these from escaping the hold 110.

A connection point 50 for a water supply hose 6 is externally positioned on the shroud 12. Preferably, the supply hose 6 and connection point 50 are equipped with quick-connect (or snap) type fittings. From the connection point 50, water is directed either internally to the hub mount 14 and rotor in turn, or externally to the external fluid line 40. If need be, fluid flow to the external fluid line 40 can be cut off using a valve.

The misting apparatus 10 of the embodiment illustrated weighs between 6 kg and 8 kg, which allows the unit to be handled by persons safely, and provides the capability to lower the misting apparatus 10 into the hold 110 of the vessel 100 without need for any lifting devices. In this case, the misting apparatus 10 are lowered using adjustable straps.

The misting apparatus 10 and dust suppression system 1 described herein can be used in, or as a part of, or in conjunction with, either of the apparatus (i.e. misting bar apparatus) or system (i.e. misting bar system) disclosed in PCT/AU2013/000550.

Figure 6:
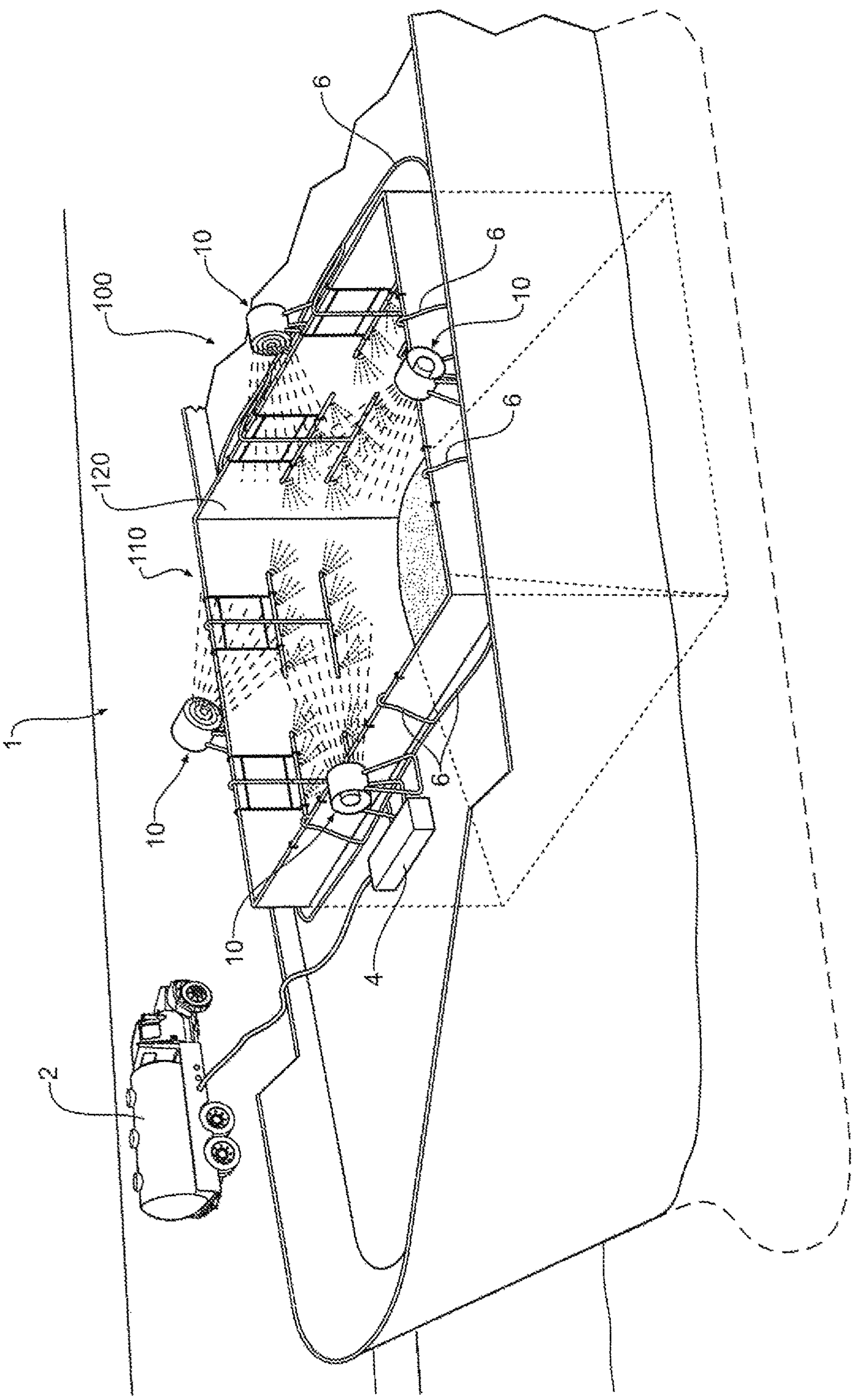
FIG. 6 is a schematic illustration of a dust suppression system according to a further embodiment.

It is possible to have one or more misting apparatus 10 attached to a single supply line (or hose), as illustrated in FIG. 1. Misting apparatus 10 can also be used whilst the misting bar system is being used (see FIG. 6), or in a stand-alone capacity. A plug and play configuration allows for a circuit for a misting system comprising either misting apparatus 10 and/or misting bars.

The misting apparatus 10 creates a very concentrated mist which is thrown significantly further than the mist generated by the misting bar. This allows total hatch coverage for those difficult vessel configurations that prevent the misting bar being located around all four sides of the hatch.

Moreover, the deeper penetration or throw of the mist generated by the misting apparatus 10 may eliminate the need to lower a misting bar past the hatch coamings of the vessel (i.e. so as to overhang past the hatch coaming). Lowering a mist bar system past the sides of the hatch coamings increases the risk of a tippler spreader, or grabs, or crane ropes getting tangled in the misting bar system during trimming of the vessel, where trimming of the vessel requires the operator to get close to the sides of the vessel.

During windy conditions, the wind will try to force the mist out of the hold 110 before it has time to mitigate the dust being generated. The misting apparatus 10 provides a more directional and deeper penetration of the mist in the hold 110.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A misting apparatus comprising:
- a body,
- a rotating assembly supported by the body so as to be rotatable about an axis of rotation, the rotating assembly comprising:
  - a fan,
  - a turbine comprising at least one rotor assembly,
  - a fluid emitter issuing a jet of a fluid to drive the rotating assembly via the rotor assembly, the fluid emitter being so positioned with respect to the fan as to issue the jet of fluid into the airflow generated by the fan to form a mist that is carried by the airflow,
- a further means for introducing the fluid to the airflow.

2. The misting apparatus of claim 1, wherein the turbine is a reaction turbine.

3. The misting apparatus as in claim 1, wherein the rotating assembly comprises a hub, the fan comprises at least one fan blade depending from the hub, and the rotor assembly comprises at least one rotor arm comprising the fluid emitter extending radially from the hub and receiving a supply of a fluid therefrom, and wherein the or each rotor arm is adapted to issue the jet of the fluid at a distance from the axis of rotation to drive rotation of the rotating assembly and the or each fan blade depending therefrom, to create an airflow into which the or each jet of fluid is issued.

4. The misting apparatus of claim 3, wherein the or each rotor arm is tubular and the fluid emitter is a jet nozzle oriented to discharge the jet to drive rotation of the rotating assembly.

5. The misting apparatus as in claim 3, wherein the rotating assembly comprises a plurality of fan blades equispaced around the hub to form the fan.

6. The misting apparatus as in claim 3, wherein the rotating assembly comprises a plurality of rotor arms equispaced around the hub to form the rotor assembly positioned in the airflow issuing from the fan.

7. The misting apparatus of claim 1, wherein the turbine is an impulse turbine.

8. The misting apparatus of claim 7, wherein the fluid emitter depends from the body, the rotating assembly comprises a hub, the fan comprises at least one fan blade depending from the hub, and the rotor assembly comprises at least one blade or bucket at which the jet of fluid is directed to drive rotation of the rotating assembly and the or each fan blade depending therefrom, to create an airflow into which the or each jet of fluid is issued.

9. The misting apparatus as in claim 1, wherein the body comprises a shroud for the rotating assembly.

10. The misting apparatus of claim 9, wherein the shroud is tubular, and comprises a central axis which is substantially coaxial with the axis of rotation for the rotating assembly, and which comprises an inlet for air, and an outlet for a mist entraining airflow.

11. The misting apparatus as in claim 10, wherein this further comprises a fluid line extending about a perimeter of the outlet, the fluid line comprising a plurality of spaced secondary fluid emitters each directed so as to release fluid into the airflow.

12. The misting apparatus of claim 11, wherein the secondary fluid emitters are misting nozzles.

13. A misting apparatus comprising:

a body;

a rotating assembly supported by the body so as to be rotatable about an axis of rotation, wherein the body has a tubular shroud for the rotating assembly, the tubular shroud having a central axis which is substantially coaxial with the axis of rotation for the rotating assembly and which has an inlet for air and an outlet for a mist entraining airflow, the rotating assembly further comprising:

a fan;

a turbine comprising at least one rotor assembly;

a fluid emitter issuing a jet of a fluid to drive the rotating assembly via the rotor assembly, the fluid emitter being positioned with respect to the fan to deliver the jet of fluid into the airflow generated by the fan to form a mist that is carried by the airflow; and a fluid line extending about a perimeter of the outlet, the fluid line comprising a plurality of spaced secondary fluid emitters each directed to release fluid into the airflow.

14. The misting apparatus of claim 13, wherein the secondary fluid emitters are misting nozzles.

15. The misting apparatus of claim 13, wherein the turbine is a reaction turbine.

16. The misting apparatus of claim 13, wherein the rotating assembly comprises a hub, the fan comprises at least one fan blade depending from the hub, and the rotor assembly comprises at least one rotor arm comprising the fluid emitter extending radially from the hub and receiving a supply of a fluid therefrom, and wherein each rotor arm is adapted to deliver the jet of fluid at a distance from the axis of rotation to drive rotation of the rotating assembly and each fan blade depending therefrom to create the airflow.

17. The misting apparatus of claim 16, wherein each rotor arm is tubular and the fluid emitter is a jet nozzle oriented to discharge the jet to drive rotation of the rotating assembly.

18. The misting apparatus of claim 16, wherein the rotating assembly comprises a plurality of fan blades equi-spaced around the hub to form the fan.

19. The misting apparatus of claim 16, wherein the rotating assembly comprises a plurality of rotor arms equi-spaced around the hub to form the rotor assembly positioned in the airflow issuing from the fan.

20. The misting apparatus of claim 13, wherein the turbine is an impulse turbine.

21. The misting apparatus of claim 20, wherein the fluid emitter depends from the body, the rotating assembly comprises a hub, the fan comprises at least one fan blade depending from the hub, and the rotor assembly comprises at least one blade or bucket at which the jet of fluid is directed to drive rotation of the rotating assembly and each fan blade depending therefrom to create the airflow.

* * * * *